United States Patent
Patel et al.

(10) Patent No.: US 7,068,508 B2
(45) Date of Patent: Jun. 27, 2006

(54) DOCKING STATION COOLING SYSTEM INCLUDING LIQUID-FILLED HOLLOW STRUCTURE

(75) Inventors: Chandrakant Patel, Fremont, CA (US); Cullen E. Bash, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 290 days.

(21) Appl. No.: 10/728,889

(22) Filed: Dec. 8, 2003

(65) Prior Publication Data

US 2005/0122678 A1 Jun. 9, 2005

(51) Int. Cl.
*H05K 7/20* (2006.01)

(52) U.S. Cl. ............... 361/699; 361/687; 361/698; 165/185; 165/104.19; 62/259.2

(58) Field of Classification Search ............ 361/687, 361/689, 698–699, 700–704, 707, 709, 711; 165/46, 185; 62/259
See application file for complete search history.

(56) References Cited

U.S. PATENT DOCUMENTS

| | | | |
|---|---|---|---|
| 5,704,212 A | 1/1998 | Erler et al. | |
| 5,757,615 A | 5/1998 | Donahoe et al. | |
| 5,960,866 A | 10/1999 | Kimura et al. | |
| 5,969,939 A * | 10/1999 | Moss et al. | 361/686 |
| 6,038,128 A | 3/2000 | Hood, III et al. | |
| 6,118,654 A | 9/2000 | Bhatia | |
| 6,362,959 B1 | 3/2002 | Tracy | |
| 6,418,017 B1 | 7/2002 | Patel et al. | |
| 6,453,378 B1 | 9/2002 | Olson et al. | |
| 6,560,104 B1 | 5/2003 | DeHoff et al. | |
| 6,795,311 B1 * | 9/2004 | Pokharna et al. | 361/687 |
| 2003/0061824 A1 | 4/2003 | Marsala | |
| 2003/0123223 A1 | 7/2003 | Pokhama et al. | |
| 2004/0130870 A1 * | 7/2004 | Fleck et al. | 361/687 |

* cited by examiner

*Primary Examiner*—Michael Datskovskiy
(74) *Attorney, Agent, or Firm*—Richard P. Lange (57) ABSTRACT

A docking station includes a housing receiving a portable computer. A liquid-filled hollow structure is provided on a portion of the housing. The liquid-filled hollow structure is in thermally conductive relation to the portable computer when the portable computer is docked in the docking station such that heat is transferred from the portable computer to the liquid-filled hollow structure.

28 Claims, 5 Drawing Sheets

DOCKING STATION COOLING SYSTEM INCLUDING LIQUID-FILLED HOLLOW STRUCTURE

TECHNICAL FIELD

This invention relates generally to a cooling system for a docking station. More particularly, the invention relates to a liquid-filled hollow structure included in a cooling system for a docking station.

BACKGROUND

Generally a portable computer, such as a laptop computer, is optimized to reduce size and weight. This often requires tradeoffs, for example, in the size of the display and keyboard, as well as the number and types of ports which are provided in the portable computer.

One way to increase the versatility of a portable computer is to use a docking station. The docking station provides a number of different types of ports for connecting the portable computer to various peripheral devices when the portable computer is docked in the docking station. These ports are used, for example, to drive a large monitor, communicate with various peripherals, such as a keyboard and mouse, provide a connection to a network, and provide connection to an external power supply, such as an AC power source which may be used to charge a battery for the portable computer and provide power for the portable computer when docked.

The docking station may reside in a permanent location with ports connected to the various peripheral devices and an AC power source. For example, when "at the office", a user can take advantage of the power of a full desktop computer, which is usually not available when a battery is used to provide power for the portable computer, by connecting the portable computer to the docking station. Performance of the portable computer may be scaled back when running on battery power. When the portable computer is docked and connected to the AC power source, the portable computer may be able to increase its performance due to the increased availability of power. Furthermore, when docked, the laptop may be connected to the peripheral devices, such as a keyboard, mouse, and monitor, to substantially function as a desktop computer. When "on the road" the user has the advantage of a light weight and small sized personal computer.

Portable computers, with ever increasing processing speed and capabilities, have incurred some new problems. Portable computers are being equipped with larger and faster processors that dissipate an increasing amount of heat. In addition to processors, other components in the portable computer, such as a power supply, a disk drive, and memory, dissipate a significant amount of heat. In order to maintain an optimum temperature for the components within the portable computer, a cooling system is used to remove the heat dissipated by the components.

Figure 5:
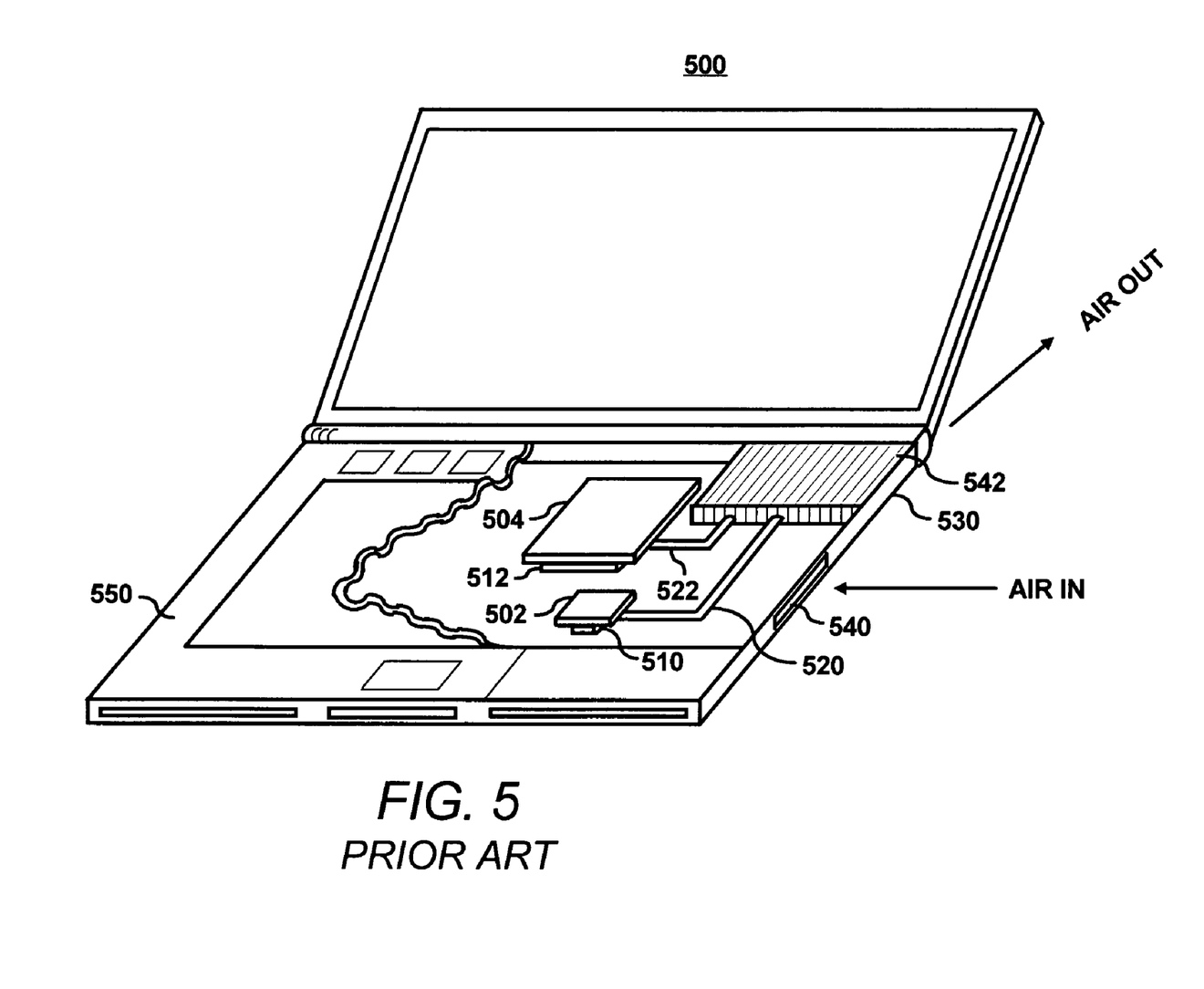
FIG. 5 illustrates a conventional cooling system in a laptop.

FIG. 5 illustrates an example of a typical cooling system in a laptop 500. The laptop 500 may include several internal heat generating components, such as a microprocessor, power supply, memory, etc. For purposes of illustration, only a microprocessor 510 and a power supply 512 are shown. Affixed to the microprocessor 510 and the power supply 512 are evaporators 502 and 504. The evaporators 502 and 504 may include heat sinks, such as an aluminum or copper block or other material with sufficient heat transfer properties, for collecting the heat generated by the components. Attached to the evaporators 502 and 504 are heat pipes 520 and 522. Heat pipes are commonly used to transfer heat from one location to another. Heat pipes are commercially available from companies such as Thermacore. Heat dissipated by the heat generating components and collected at the evaporators 502 and 504 is transferred via the heat pipes to a condenser 530. Air is drawn into the housing 550 through an inlet 540 by a fan (not shown) and across the condenser 530. Heat from the condenser 530 is transferred to the ambient air. The heated air exits the housing 550 at the outlet 542. The condenser 530 may include a finned heat sink to increase the surface area of the condenser 530, thereby increasing the amount of heat transferred to the ambient air.

Laptops are generally performance limited when compared to their desktop counterparts. A laptop with a similar microprocessor and memory is generally configured to consume less power than a similar desktop machine due to the limited availability of power (e.g., limited battery capacity) and the limitations of the cooling system employed by the laptop. As described previously, a portable computer may be scaled back when running on battery power. For example, microprocessor power consumption is generally gated when the laptop is running on battery power. On the other hand, when a laptop is connected to an AC power source, such as when docked in a docking station, the gating mechanism is reduced or de-activated to allow the microprocessor to increase performance, such as increase processing speed. However, even when a laptop is docked in a docking station, the microprocessor may not increase performance to its maximum capacity due to increased heat dissipation and limitations on the laptop cooling system. For example, a secondary effect of running the laptop on AC power is that heat is dissipated in the battery compartment due to inefficiencies in the charging process. Furthermore, when a laptop is docked in a docking station, the laptop is typically closed, causing more heat to remain in the housing of the laptop. The increased heat dissipation when the laptop is docked and the inherent limitations placed on a laptop cooling system, such as size of condensers and evaporators, are limiting factors on the docked performance of a laptop. These limiting factors may result in the performance of the microprocessor being scaled back.

SUMMARY OF THE EMBODIMENTS

According to an embodiment, a portable computer docking station is provided. A liquid-filled hollow structure is provided on a portion of a housing for the docking station. The liquid-filled hollow structure is in thermally conductive relation to the portable computer when the portable computer is docked in the docking station such that heat is transferred from the portable computer to the liquid-filled hollow structure.

According to yet another embodiment, a docking station cooling system includes a liquid-filled hollow structure. The liquid-filled hollow structure includes an evaporator section and a condenser section. The evaporator section is in thermally conductive relation to a portable computer docked in the docking station to allow heat to be transferred from the portable computer to the evaporator section. A heat sink is in thermally conductive relation to the condenser section to dissipate the heat transferred from the portable computer. The liquid-filled hollow structure includes a liquid that vaporizes in the evaporator section in response to being heated by the heat transferred from the portable computer.

The vapor condenses back to the liquid in the condenser section, and the condensed liquid travels back to the evaporator section.

According to yet another embodiment, a docking station includes a housing means for receiving a portable computer and a liquid-filled hollow structure means provided on a portion of the housing means. The liquid-filled hollow structure means is in thermally conductive relation to the portable computer when the portable computer is docked in the docking station for receiving heat transferred from the portable computer.

BRIEF DESCRIPTION OF THE DRAWINGS

Various features of the embodiments can be more fully appreciated with reference to the following detailed description of the embodiments when considered in connection with the accompanying figures, in which.

DETAILED DESCRIPTION OF THE EMBODIMENTS

For simplicity and illustrative purposes, the principles of the present invention are described by referring mainly to exemplary embodiments thereof. However, one of ordinary skill in the art would readily recognize that variations are possible without departing from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the embodiments is defined by the appended claims and their equivalents.

A docking station includes a cooling system providing supplemental cooling for a portable computer docked in the docking station. The docking station may be any device that mates with, receives, and/or holds a portable computer. A portable computer may include various types of electronic devices, many having a processing unit, including laptops, personal digital assistants, electronic test instruments, bar code readers, etc., and various other electronic devices that are configured to dock with a docking station. The docking station may provide connectivity to various peripheral devices including an external power supply. The base of the portable computer typically connects to the docking station to allow use of a larger monitor and a full size keyboard among other peripheral devices. This allows a user to operate a portable computer in a more ergonomic desktop computer setting rather than using the small keyboard and screen often provided in a portable computing device.

According to an embodiment, a docking station includes a cooling system comprising a liquid-filled panel in thermally conductive relation to a portable computer docked in the docking station. The liquid-filled panel includes a hollow structure holding a liquid. Heat dissipated by the heat generating components of the portable computer is transferred from the portable computer to the liquid-filled panel, improving the cooling of the portable computer. Thus, the cooling system in the docking station provides additional cooling for a portable computer docked in the docking station. Therefore, a processor in the portable computer, which may conventionally be scaled back because of excessive heat dissipation, for example, caused by a charging battery, can function in a full performance mode.

Figure 1:
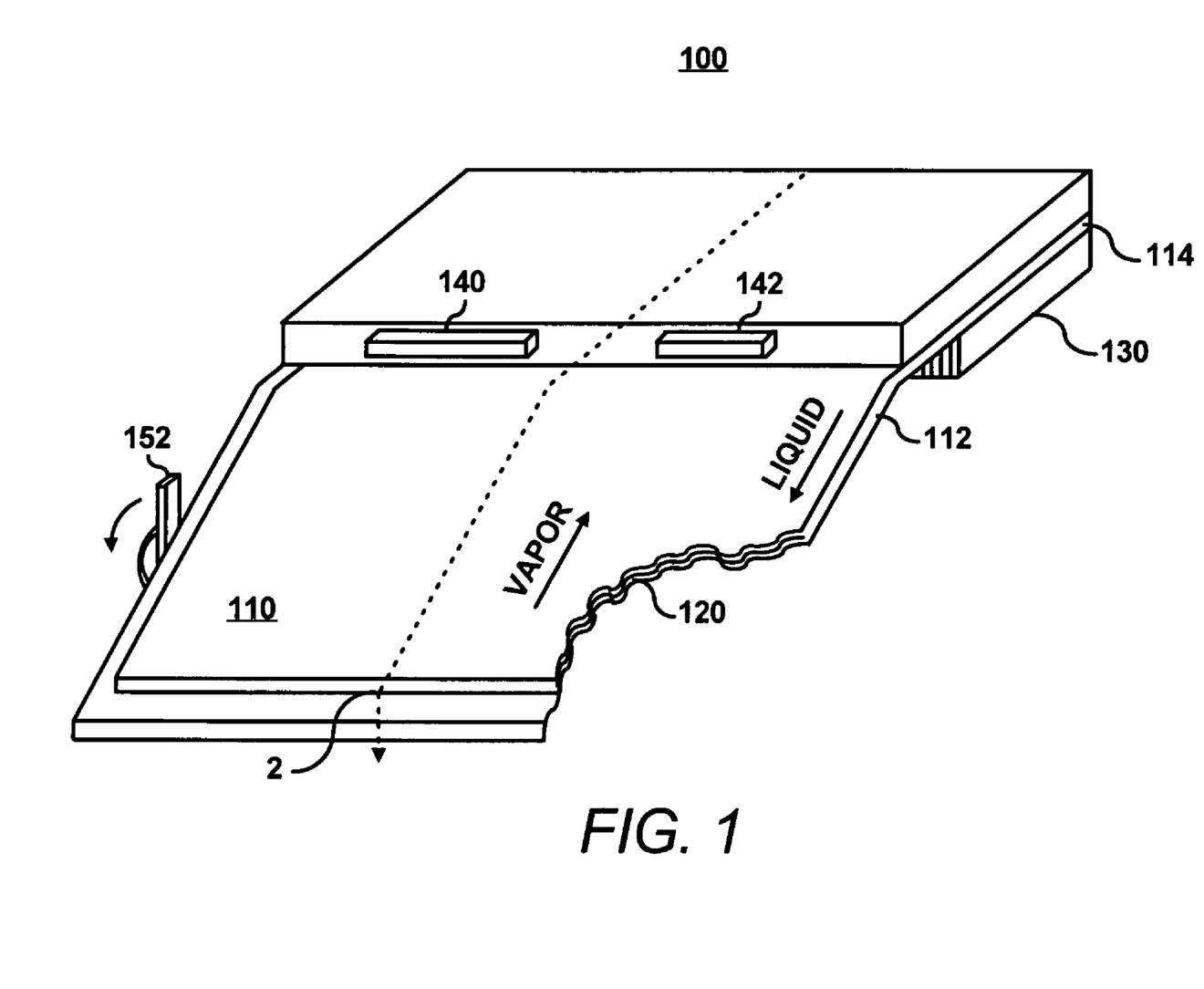
FIG. 1 illustrates a view of a docking station including a liquid-filled panel, according to an embodiment, wherein a portion of the liquid-filled panel is cut away.
Figure 3:
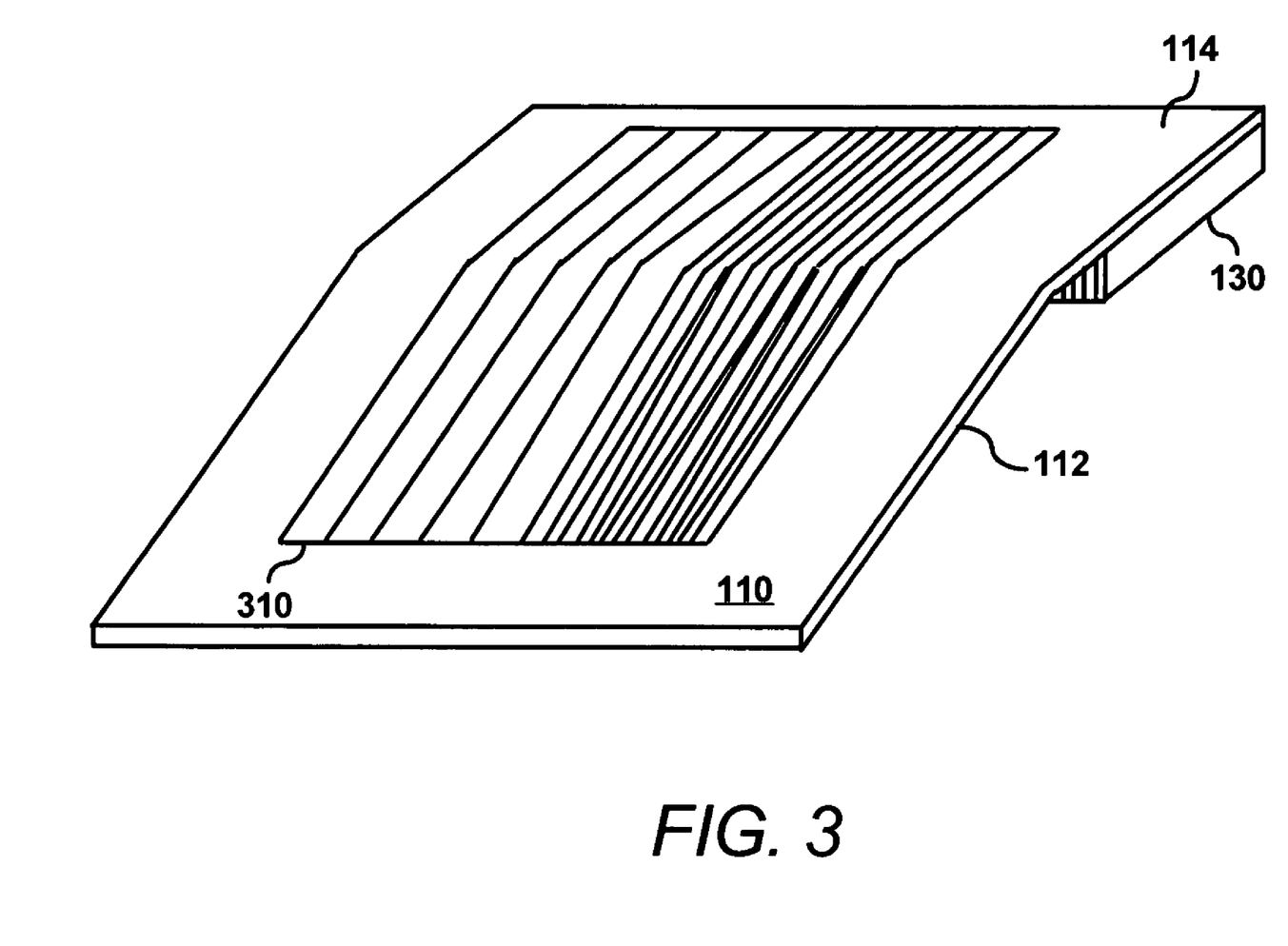
FIG. 3 illustrates an embodiment of the liquid-filled panel including channels.

FIG. 1 illustrates a docking station 100 employing a liquid filled panel 110. The liquid-filled panel 110 is provided on an upper portion of the docking station 100. The liquid filled-panel 110 comprises a hollow structure filled with liquid 120, such as shown in the cut away view of the liquid-filled panel 110. The liquid 120 may include a liquid that boils at low temperatures. Examples of the liquid 120 include 3M Fluorinert, 3M Novec, R134a, water at reduced pressure, etc. In one embodiment, the liquid-filled panel 110 includes a roll bond panel manufactured by Showa Aluminum. A roll bond panel includes a hollow panel created by bonding two aluminum panels with a masking layer. The masked layer is pressurized to create the hollow area between the aluminum panels where the liquid 120 is provided. Also, instead of a single hollow structure, the aluminum panels may be masked to create multiple channels oriented in a preferential direction. Examples of channels are shown in FIG. 3. In other embodiments, the liquid-filled panel 110 may include a hollow core aluminum extruded plate with parallel channels, a hollowed copper plate, or a flat plate constructed with heat pipe mesh.

The liquid-filled panel 110 is divided into an evaporator section 112 and a condenser section 114. The evaporator section 112 extends below a portable computer (not shown) when the portable computer is docked in the docking station 100, such that the portable computer is in thermally conductive relation to the liquid-filled panel 110. For example, a bottom surface of the portable computer may contact the liquid-filled panel 110 resulting in heat being transferred via conduction from the portable computer to the liquid-filled panel 110. In another embodiment, a material such as copper or a thermally conductive gap filling material, such as manufactured by Bergquist, is provided between the portable computer and the liquid-filled panel 110 to reduce contact resistance and enhance heat transfer.

As heat is transferred from the portable computer to the evaporator section 112 of the liquid-filled panel 110, the liquid 120 in the evaporator section 112 boils and turns into a vapor. The vapor is pushed by internal pressure and buoyancy forces towards the condenser section 114. In the condenser section 114, the vapor is cooled and condenses back to a liquid form. The condenser section 114, for example, is in thermally conductive relation to a heat sink 130. Heat is transferred from the condenser section 114 to the heat sink 130 cooling the vapor and causing it to condense back to a liquid form. A fan (not shown) may be provided to cause air to flow past the heat sink 130 to enhance heat transfer from the heat sink 130 to the ambient air. Also, the heat sink 130 may comprise a finned heat sink to increase the surface area exposed to the ambient air. The heat sink 130 may be a separate piece attached to the condenser section 114 with a connection means, such as screws, welds, thermally conductive epoxy, etc. Also, the heat sink 130 may be incorporated in the condenser section 114, such as machined from the condenser section 114.

In one embodiment, the condenser section 114 is provided at a higher orientation than the evaporator section 112. In such an orientation, gravity aids in the return of the liquid 120 from the condenser section 114 to the evaporator section 112 where the cycle repeats. Channels may be provided within the liquid-filled panel 110 to enhance capillary forces to aid the liquid 120 in its return to the evaporation section 112. The channels may include a wick structure, such as spiral bundle, sintered metal, etc., for providing capillary pressure that enables the liquid 120 to return to the evaporator section 112 with or without the aid of gravity. The channels may be axially grooved or may be provided with a mesh to aid in the return of the liquid 120, as in a heat pipe. FIG. 3, described in detail below, illustrates channels 310 in the liquid-filled panel 110.

In one embodiment, the evaporator section 112 may be sized to contact substantially the entire bottom surface of a portable computer docked in the docking station 100 to enhance thermal conduction. Also, the evaporator section 112 may include heat transfer subsections located near hot spots in the portable computer, such as at locations that correspond to locations of a processor and power supply in the portable computer. The condenser section 114 may be of the same width or smaller width than the width of the evaporator section 112. In one embodiment, the condenser section 114 is of similar size to the heat sink 130.

The docking station 100 may include a lever mechanism 150 or other biasing means for biasing the liquid-filled panel 110 against the portable computer to reduce thermal resistance between the portable computer and the liquid filled panel 110. The amount of pressure applied by the biasing means, such as the lever mechanism 150, may be based on the material performance (e.g., the liquid-filled panel 10 and possibly gap filling material 160) at various pressure levels that provides optimum thermal conductance. Also, the docking station 100 may include ports 140 and 142 for providing network connections, AC power connections, keyboard, mouse, monitor connections etc. for a docked portable computer.

Figure 2:
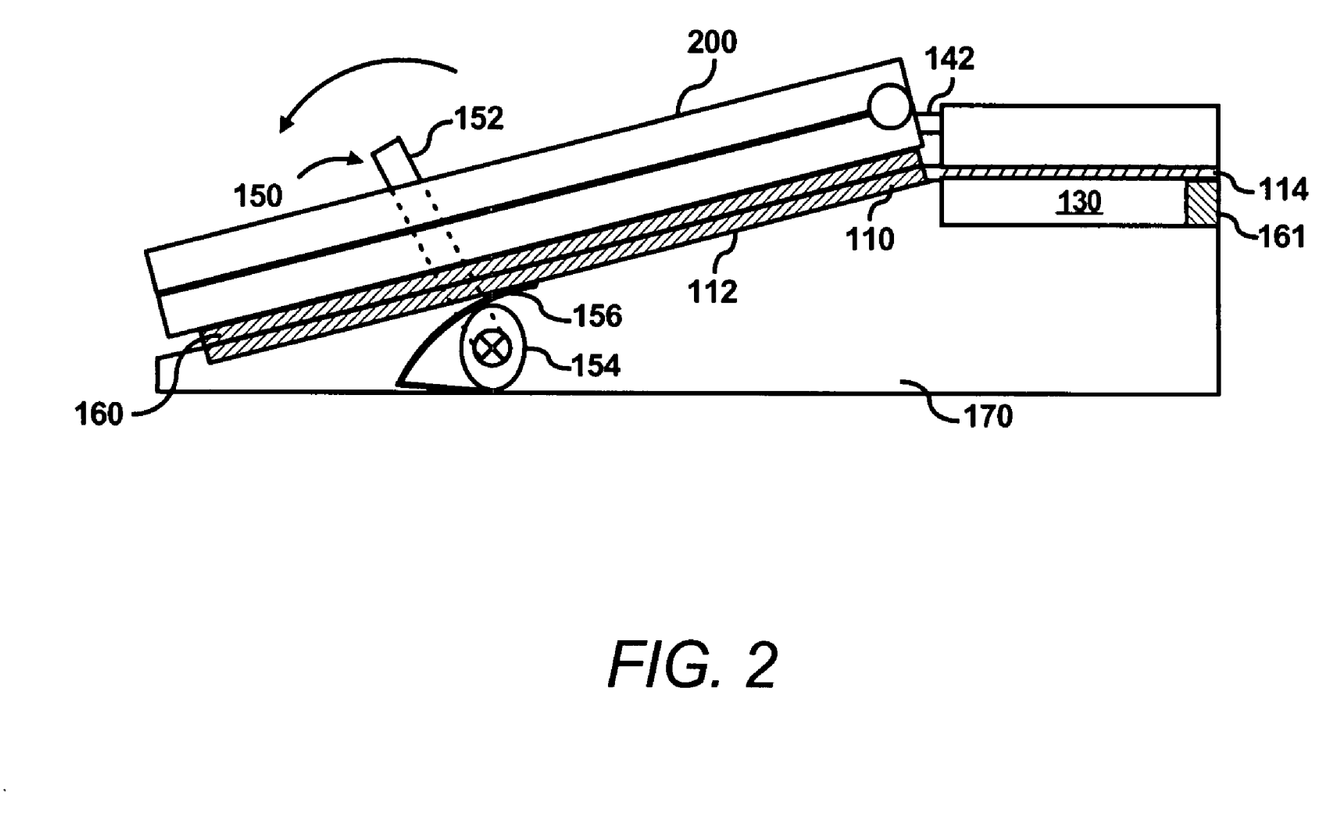
FIG. 2 illustrates a side view of a docking station, according to an embodiment.

FIG. 2 illustrates a side view of the docking station 100 with a laptop 200 docked in the docking station 100. FIG. 2 is a cross-section of the docking station 100 taken along dashed-line 2 shown in FIG. 1. The laptop 200 is shown by way of example, and docking stations similar to the docking station 100 may used for other types of portable computers.

In one embodiment, the housing 170 of the docking station 100 includes an angled section supporting the evaporator section 112 of the liquid-filled panel 110 and a flat section supporting the condenser section 114. The angled section of the housing 170 may be used to facilitate a liquid flow from the condenser section 114 towards the evaporator section 112. A fan 161 may be used to pull air through an inlet (not shown) and across the heat sink 130, where the heated air exits the housing 170.

The docking station 100 may include a lever mechanism 150 for biasing the liquid-filled panel 110 against the laptop 200 to reduce thermal resistance. The lever mechanism 150 may include a lever 152 connected to a cam. In the embodiment shown in FIG. 2 the cam comprises an oval-shaped device 154. However, other known types of cams may be used. The oval-shaped device 154 is in contact with a spring 156. After the laptop 200 is docked in the docking station 100, such as shown in FIG. 2, the lever 152 is moved in the direction of the arrow. As the lever 152 is moved in the direction of the arrow (e.g., counterclockwise), the oval-shaped device 154 rotates on its center axis to a vertical orientation shown in FIG. 2, causing the spring 156 to be biased towards the laptop 200. Prior to removing the laptop 200 from the docking station 100, the lever 152 may be rotated in the opposite direction (e.g., clockwise) to a horizontal orientation for releasing the force from the oval-shaped device 154 applied against the spring 156. In another embodiment, only the spring 156 is used to bias the liquid-filled panel 110 against the laptop 200.

The oval-shaped device 154 may extend the width of the liquid-filed panel 110 for uniformly biasing the liquid-filled panel 110 towards the laptop 200. Also, lever mechanisms may be provided on one or both ends of the oval-shaped device 154 extending the width of the liquid-filled panel 110. The lever mechanism 150 may serve a dual purpose of placing the laptop 200 in a docked position in the docking station 100 such that the laptop 200 is connected to the ports 140 and 142 and applying pressure to the liquid-filled panel 110 to improve thermal conductance.

A thermally conductive material 160 may be optionally provided between the laptop 200 and the liquid-filled panel 110 to reduce contact resistance and enhance heat transfer. The material may include copper or a thermally conductive gap filling material, such as manufactured by Bergquist, etc.

FIG. 3 illustrates an embodiment of the liquid-filled panel 110 shown in FIG. 1 including channels 310. The docking station 100 is not shown in FIG. 3 for purposes of illustrating the embodiment of the liquid-filled panel 110.

The channels 310 holding the liquid 120 may be provided within the liquid-filled panel 110. The channels 310 are hollow structures holding the liquid 120. The liquid 120, for example, vaporizes in the channels 310 in the evaporation section 112 and condenses in the condenser section 114. The channels 310 may be axially grooved or may be provided with a mesh to aid in the return of the liquid 120 to the evaporator section 112, as in a heat pipe. Also, the channels 310 in the evaporator section 112 may be located near hot spots in the portable computer, such as at locations that correspond to locations in the portable computer where a substantial amount of heat is dissipated. For example, the channels 310 may be located relative to a processor and a power supply in the portable computer. FIG. 3 illustrates an increased number of channels 310 in proximity with the hot spots. In other embodiments, the evaporator section 112 may only include channels 310 in proximity with the hot spots. Furthermore, the channels 310 may vary in shape, size, and orientation, particularly when being formed to coincide with hot spots.

Figure 4:
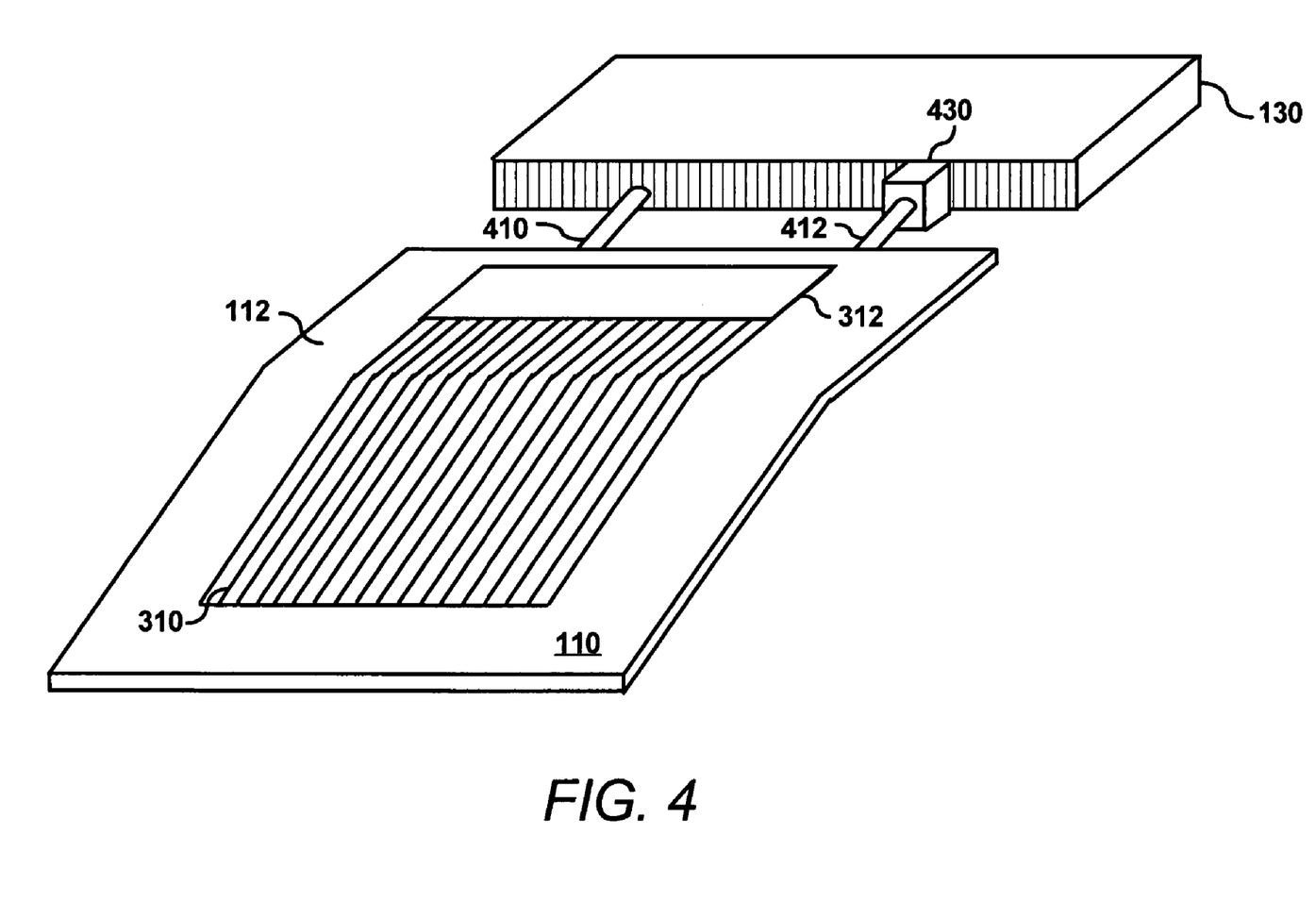
FIG. 4 illustrates another embodiment of the liquid-filled panel including heat pipes connecting an evaporator section and a condenser section.

FIG. 4 illustrates yet another embodiment of the liquid-filled panel 110. In this embodiment, the evaporator section 112 and the condenser section 114 are connected via heat pipes 410 and 412. In one embodiment, the heat pipes 410 and 412 may include flexible material, such as hoses or other types of flexible devices that may hold vapor and condensed fluid. Also, a single heat pipe or multiple heat pipes may be used to connect the evaporator section 112 and the condenser section 114. Also, the dimensions of the heat pipes 410 and 412 can be selected to optimize liquid flow between the evaporator section 112 and the condenser section 114.

The channels 310 are shown in the evaporator section 112, but a single hollow structure may also be used for the evaporator section 112. When the liquid 120 in the channels 310 vaporizes, the vapor flows to the reservoir 312 connected to the heat pipes 410 and 412. The vapor travels to the condenser section 114 and is cooled. The condensed liquid 120 travels back to the evaporator section 112 via the heat pipes 410 and 412. The condenser section 114 may also include channels similar to the channels 310 or may include a single hollow structure.

Using the heat pipes 410 and 412 helps facilitate placing the evaporator section 112 and the condenser section 114 in different orientations. For example, the evaporator section 112 may be provided on an angular surface of the housing for the docking station 100 or on a plane lower than the condenser section 114 to allow gravity to aid the flow of the liquid 120 back to the evaporator section 112.

A pump 430 may optionally be used to promote the flow of the liquid 120 within the liquid-filled panel 110. In an embodiment using the pump 430, a single phase liquid rather than a two-phase (e.g., liquid/vapor) is used in the liquid-filled panel 110. In this embodiment, the pump 430 cycles the liquid between the evaporator section 112, which is a cold plate, and the condenser section 114, which is a heat exchanger. The liquid is heated in the evaporator section 112 and cooled in the condenser section 114.

In yet another embodiment, the pump 430 is used with the two-phase liquid 120. In this embodiment, the pump 430 is connected to the heat pipe 410 for pumping the liquid 120 back to the evaporator section 112 after the vaporized liquid 120 is condensed to a liquid form in the condenser section 114. Thus, the pump 430 may also be used to aid the liquid 120 in returning to the evaporator section 112.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A docking station comprising:
   a housing operable to receive a portable computer; and
   a liquid-filled hollow structure provided on a portion of the housing, the liquid-filled hollow structure being in thermally conductive relation to the portable computer when the portable computer is docked in the docking station such that heat is transferred from the portable computer to the liquid-filled hollow structure; and
   a biasing structure biasing the liquid-filled hollow structure towards the portable computer when the portable computer is docked in the docking station.

2. The docking station of claim 1, wherein the liquid-filled hollow structure comprises:
   an evaporator section operable to receive heat from the portable computer when the portable computer is docked in the docking section; and
   a condenser section operable to dissipate the heat received from the portable computer.

3. The docking station of claim 2, further comprising a heat sink connected to the condenser section, the heat sink being operable to dissipate the heat received from the portable computer.

4. The docking station of claim 2, wherein the evaporator section is provided on an angular surface of the housing such that the condenser section is at a higher orientation than a substantial portion of the evaporator section.

5. The docking station of claim 2, wherein the liquid-filled hollow structure includes a liquid that vaporizes in the evaporator section in response to being heated by the heat transferred from the portable computer and that condenses back to the liquid in the condenser section, wherein the condensed liquid travels back to the evaporator section.

6. The docking station of claim 5, wherein the condensed liquid traveling back to the evaporator section is aided by one or more of a wicking structure in the liquid-filled hollow structure and gravity.

7. The docking station of claim 1, further comprising a heat transfer material provided between the liquid-filled hollow structure and the portable computer docked in the docking station.

8. The docking station of claim 1, wherein the biasing structure comprises:
   a cam operable to force the liquid-filled hollow structure towards the portable computer; and
   a lever connected to the cam, the lever controlling the cam to force the liquid-filled hollow structure towards the portable computer.

9. The docking station of claim 8, wherein the cam further comprises an oval-shaped device operable to rotated between a vertical orientation and a horizontal orientation, such that in the vertical position the oval-shaped device biases the liquid-filled hollow structure towards the portable computer and in the horizontal position the oval-shaped device does not bias the liquid-filled hollow structure towards the portable computer; and
   the lever is connected to the oval-shaped device, wherein the lever is operable to be positioned to force the oval-shaped device into one of the vertical orientation and the horizontal orientation.

10. The docking station of claim 8, wherein the biasing structure further comprises a spring biasing the liquid-filled hollow structure towards the portable computer.

11. The docking station of claim 8, wherein the cam is further operable to bias the portable computer to a docked position where the portable computer is connected to ports in the docking station.

12. The docking station of claim 2, wherein a size of the evaporator section is approximately equal to a size of a bottom surface of the portable computer when docked in the docking station.

13. The docking station of claim 3, wherein the condenser section is at least as large as a surface of the heat sink contacting the condenser section.

14. A docking station comprising:
   a housing operable to receive a portable computer;
   a liquid-filled hollow structure provided on a portion of the housing, the liquid-filled hollow structure being in thermally conductive relation to the portable computer when the portable computer is docked in the docking station such that heat is transferred from the portable computer to the liquid-filled hollow structure;
   wherein the liquid-filled hollow structure further comprises an evaporator section operable to receive heat from the portable computer when the portable computer is docked in the docking section; and a condenser section operable to dissipate the heat received from the portable computer;
   wherein one or more of the evaporator section and the condenser section includes channels holding the liquid in the liquid-filled hollow structure.

15. The docking station of claim 14, wherein the channels in the evaporator section are proximally located to hot spots of the portable computer docked in the docking station.

16. A docking station comprising:
   a housing operable to receive a portable computer; and
   a liquid-filled hollow structure provided on a portion of the housing, the liquid-filled hollow structure being in thermally conductive relation to the portable computer when the portable computer is docked in the docking station such that heat is transferred from the portable computer to the liquid-filled hollow structure;

wherein the liquid-filled hollow structure further comprises an evaporator section operable to receive heat from the portable computer when the portable computer is docked in the docking section; and a condenser section operable to dissipate the heat received from the portable computer;

wherein the liquid-filled hollow structure includes a liquid that vaporizes in the evaporator section in response to being heated by the heat transferred from the portable computer and that condenses back to the liquid in the condenser section, wherein the condensed liquid travels back to the evaporator section;

wherein the evaporator section and the condenser section are connected via at least one heat pipe operable to carry the liquid and the vapor in the liquid-filled hollow structure.

17. The docking station of claim 16, further comprising a pump connected to the at least one heat pipe, the pump pumping the liquid from the condenser section to the evaporator section.

18. The docking station of claim 1, wherein the liquid-filled hollow structure comprises:
a cold plate section operable to receive heat from the portable computer when the portable computer is docked in the docking section; a heat exchanger section operable to dissipate the heat received from the portable computer; and a liquid heated in the cold plate section and cooled in the heat exchanger section.

19. The docking station of claim 18, further comprising a pump circulating the liquid between the heat exchanger section and the cold plate section.

20. The docking station of claim 19, further comprising at least one heat pipe connecting the heat exchanger section and the cold plate section.

21. The docking station of claim 20, wherein the at least one heat pipe is flexible.

22. A docking station cooling system comprising:
a liquid-filled hollow structure including an evaporator section and a condenser section, wherein the evaporator section is in thermally conductive relation to a portable computer docked in the docking station such that heat is transferred from the portable computer to the evaporator section;
a biasing structure biasing the liquid-filled hollow structure towards the portable computer when the portable computer is docked in the docking station; and
a heat sink in thermally conductive relation to the condenser section to dissipate the heat transferred from the portable computer;
wherein the liquid-filled hollow structure includes a liquid that vaporizes in the evaporator section in response to being heated by the heat transferred from the portable computer and that condenses back to the liquid in the condenser section, wherein the condensed liquid travels back to the evaporator section.

23. The cooling system of claim 22, wherein the evaporator section is provided on an angular surface of a housing for the docking station such that the condenser section is at a higher orientation than a substantial portion of the evaporator section.

24. The cooling system of claim 22, wherein the condensed liquid traveling back to the evaporator section is aided by one or more of a wicking structure in the liquid-filled hollow structure and gravity.

25. The cooling system of claim 22, further comprising a heat transfer material provided between the liquid-filled hollow structure and the portable computer docked in the docking station.

26. The cooling system of claim 22, wherein a size of the evaporator section is approximately equal to a size of a bottom surface of the portable computer docked in the docking station.

27. A docking station comprising:
a housing means for receiving a portable computer; and
a liquid-filled hollow structure means for cooling the portable computer and provided on a portion of the housing means, the liquid-filled hollow structure means being in thermally conductive relation to the portable computer when the portable computer is docked in the docking station for receiving heat transferred from the portable computer;
wherein the liquid-filled hollow structure means comprises evaporator means for receiving heat from the portable computer when the portable computer is docked in the docking section; condenser means for dissipating the heat received from the portable computer; and channel means for channeling liquid between the evaporator means and the condenser means.

28. The docking station of claim 27, further comprising heat sink means in thermally conductive relation to the liquid filled hollow structure means, the heat sink means for dissipating the heat from the liquid-filled hollow structure means.

* * * * *